US011997461B2

(12) United States Patent
Strutt (10) Patent No.: US 11,997,461 B2
(45) Date of Patent: May 28, 2024

(54) PROXIMITY DETECTION (71) Applicant: Elliptic Laboratories AS, Oslo (NO)

(72) Inventor: Guenael Thomas Strutt, San Francisco, CA (US)

(73) Assignee: Elliptic Laboratories AS, Oslo (NO)

( * ) Notice: Subject to any disclaimer, the term of this patent is extended or adjusted under 35 U.S.C. 154(b) by 123 days.

(21) Appl. No.: 17/631,226

(22) PCT Filed: Sep. 3, 2020

(86) PCT No.: PCT/NO2020/050222
§ 371 (c)(1),
(2) Date: Jan. 28, 2022

(87) PCT Pub. No.: WO2021/045628
PCT Pub. Date: Mar. 11, 2021

(65) Prior Publication Data
US 2022/0295181 A1 Sep. 15, 2022

Related U.S. Application Data (60) Provisional application No. 62/895,065, filed on Sep. 3, 2019.

(30) Foreign Application Priority Data
Oct. 21, 2019 (NO) .................................. 20191252

(51) Int. Cl.
H04R 3/00 (2006.01)
G01S 15/04 (2006.01)
H04R 29/00 (2006.01)

(52) U.S. Cl.
CPC .............. *H04R 3/007* (2013.01); *G01S 15/04* (2013.01); *H04R 29/001* (2013.01);
(Continued)

(58) Field of Classification Search
CPC .. H04R 3/007; H04R 29/001; H04R 2400/01; H04R 2430/01; H04R 2499/11; G01S 15/04
(Continued)

(56) References Cited

U.S. PATENT DOCUMENTS 9,185,493 B2 * 11/2015 Lubberhuizen ...... H04R 29/003
9,674,625 B2 * 6/2017 Armstrong-Muntner ....................
G01S 15/876
(Continued)

FOREIGN PATENT DOCUMENTS

EP 2271134 A1 1/2011
EP 2712209 A1 3/2014
(Continued)

OTHER PUBLICATIONS

Askautrud, Jan Ove, "International Search Report" prepared for PCT/NO2020/050222, dated Oct. 11, 2020, 4 pages.

*Primary Examiner* — William J Deane, Jr.
(74) *Attorney, Agent, or Firm* — Bradley Arant Boult Cummings LLP (57) ABSTRACT

The invention relates to a method and system for detection of an object in proximity to an electronic device, which method comprises the steps of: —producing, via the processing unit using one or more parameters relating to a loudspeaker, a controlled audio signal; —amplifying using an amplifier at least said controlled audio signal, thereby producing an amplified audio signal at an amplifier output; wherein an amplitude of the controlled audio signal is such that the amplified audio signal is less than or equal to an amplitude determined to be safe for the loudspeaker in view of the one or more parameters, —analyzing at least one of said one or more parameters relating to the loudspeaker to detect a change in response of the loudspeaker; the change in response being caused by an object that is present in the
(Continued)

acoustical path of the loudspeaker, —determining, based upon the analysis whether the object is located in close proximity to the electronic device.

15 Claims, 5 Drawing Sheets

(52) U.S. Cl.
CPC ...... *H04R 2400/01* (2013.01); *H04R 2430/01* (2013.01); *H04R 2499/11* (2013.01)

(58) Field of Classification Search
USPC ..................................................... 381/55, 58
See application file for complete search history.

(56) References Cited

U.S. PATENT DOCUMENTS

| | | |
|---|---|---|
| 2004/0017921 A1 | 1/2004 | Mantovani |
| 2014/0086418 A1* | 3/2014 | Lubberhuizen ........ H04R 3/007 |
| | | 381/55 |
| 2014/0126730 A1 | 5/2014 | Crawley et al. |
| 2015/0289070 A1* | 10/2015 | Armstrong-Muntner .................... |
| | | G01S 15/003 |
| | | 381/56 |
| 2017/0329431 A1 | 11/2017 | Lin et al. |
| 2018/0136899 A1* | 5/2018 | Risberg ................... H04R 3/04 |

FOREIGN PATENT DOCUMENTS

| | | |
|---|---|---|
| JP | H0440513 A | 2/1992 |
| WO | WO-2016189285 A1 | 12/2016 |
| WO | WO-2018004547 A1 | 1/2018 |
| WO | WO-2019122864 A1 | 6/2019 |

* cited by examiner

PROXIMITY DETECTION

TECHNICAL FIELD

The present teachings relate to a method for proximity detection for an electronic device.

BACKGROUND ART

Electronic devices such as mobile phones usually comprise a proximity sensor that is used to detect proximity of an object, such as a user's body part. One of the main functions of such a proximity sensor is to detect the when the user has positioned the device close to their ear during an ongoing phone call, in which case the touchscreen of the mobile device is disabled or switched off to prevent false touch events due to unintentional contact of the ear or other body part of the user with the screen of the mobile device. Since the touch screen is not normally used while the user is in a call and has positioned the device close to their head or next to their ear, the touch screen controller can either be switched off or it may be configured in a low-power mode to save power. Additionally, the screen lighting of the device is also normally disabled to save power. Usually an infrared ("IR") proximity sensor is used, but ultrasonic proximity sensors are also known. One example of a solution involving ultrasonic proximity sensors are discussed in EP2271134 and US2017329431 using a transmitter and a microphone to detect the proximity of an object, while US2014126730 is aimed at calibrating a speaker to avoid overload by measuring the temperature.

In most mobile devices there is a requirement for a cover detection mode. Cover detection is a close-range proximity detection with a usual purpose to determine whether the screen of the mobile device should be enabled or woken up from a disable state. Accordingly, one of the important purposes of the cover detection system is to prevent the screen from being enabled when it shouldn't be. By doing so, unintentional touch events and operations as a result of an unintentional enabling of the screen of the electronic device can be prevented. Similarly, the cover detection mode should also be reliable in allowing the user a quick access to the screen whenever the user intends to operate the device. It is desired for the cover detection system to be able to reliably distinguish between events for which the screen should be enabled and the events in which the screen should remain disabled or in a sleep state. The cover detection should be quick in response for a smooth user experience.

Some users may prefer to place their mobile device in a cover for protection and personalization of the device. Covers can be of several types such as flip-cases and wallets, which when closed enclose at least a part of the screen of the device. Some mobile devices adapt the screen of the device to display a dedicated view or menu through a translucent or transparent window in the flip-cover when it is closed or covers the screen.

In the cases that are available in the market, the detection of the presence of the flip-cover over the screen, may be done, for example, using the touchscreen sensor of the mobile device, or the portion of the flip-cover that is used to cover the screen may be provided with a dedicated sensor such as a near-field communication ("NFC") sensor or a magnetic sensor that triggers a flip-case detection mode when the screen portion of the cover comes within a predetermined distance of the screen of the mobile device. A cover that requires a dedicated or specialized sensor for cover detection can be more expensive and less attractive to the customer.

There is hence a requirement of an alternative method for cover detection and a cover detection system.

SUMMARY

At least some problems inherent to the prior art will be shown solved by the features of the accompanying independent claims.

Thus, the present invention does not rely on the use of a microphone for detecting a return signal but is aimed at evaluating the loudspeaker parameters directly as the close proximity of the object will affect the performance of the speakers working conditions. The proximity will affect the working conditions of the speaker as the object comes within a range comparable to the wavelength of the emitted acoustic signal. For example the speaker moving outwards toward the object will be sensitive to the fact that there is a larger than usual pressure build-up between the speaker and the object as the pressure wave is not allowed to move freely from the speaker. This will limit the membrane movements or increase the force required to move the membrane, and represent parameters that can be measured by the speaker control system according to the invention.

The parameters related to the speaker is therefore independent on whether the speaker is able to receive acoustic signals, they are only related to the speaker as such under the existing working conditions. When the working conditions change because of an object in close proximity of the speaker it may detected.

When viewed from a first perspective, there can be provided an electronic device comprising:
- a first portion configured to generate an audio signal;
- a loudspeaker for generating an acoustic signal; wherein the loudspeaker may include a moveable membrane, but may alternatively include a glass screen with a piezo actuator or a microphone configured to transmit sound, so that the membrane when mentioned below may also be understood as the active part of the glass screen or the microphone.

The device also comprises a speaker protection module comprising a processing unit, the speaker protection module being configured to:
  receive said audio signal at the processing unit; and
  produce, via the processing unit using one or more parameters relating to the loudspeaker, a controlled audio signal;
an amplifier configured to amplify at least said controlled audio signal to produce the amplified audio signal which is passed to the loudspeaker for generating the acoustic signal, wherein
  an amplitude of the controlled audio signal is such that the amplified audio signal is less than or equal to an amplitude determined to be safe for the loudspeaker in view of the one or more parameters; and wherein
the electronic device further comprises
  a second portion configured to analyze at least one of said one or more parameters relating to the loudspeaker to detect a change in response of the movable membrane, the change in response being caused by an object that is present in the acoustical path of the membrane, and the second portion is configured to determine, based upon the analysis of the at least one parameter whether the object is located in close proximity to the electronic device.

As will be understood in the present specification the term "audio signal" will refer to electrical signals representing acoustic signals to be transmitted or has been received, within or outside the audible range within a range suitable for the available transducers. By close proximity it is broadly meant a distance of less than 5 cm from the loudspeaker.

It will be understood that the amplified audio signal is dependent upon the controlled audio signal. In other words, the amplified audio signal at least partially comprises controlled audio signal multiplied by a gain of the amplifier, or it can be said that the amplified audio signal at least partially comprises an amplified controlled audio signal.

It will be appreciated that by doing so, the one or more parameters relating to the loudspeaker may be used not only to adaptively modify the controlled audio signal such that the amplified audio signal provided to the loudspeaker is within the excursion and/or thermal limits of the loudspeaker, but also for implementing cover detection, or close-range proximity detection. This can result in significant advantages in terms of costs, design, and even performance. By using the already existing hardware that is used for speaker protection, the electronic device and SPM as proposed can be also be used for close range proximity measurements. A requirement for a separate proximity detection system can thus be obviated.

It will be understood that the detection, or measurement, of the change in response of the movable membrane can be done using, at least partially, the same loudspeaker parameters that are being measured for monitoring and/or modifying the amplitude of the controlled audio signal for it to be lying within the amplitude determined to be safe. The measurement of the change in response may even be done almost simultaneously as monitoring the amplitude using the loudspeaker parameters.

It will be appreciated that the change in response can be mainly caused by interaction of the reflection of the acoustic signal with the loudspeaker, including a membrane or a glass screen with a piezo actuator, or may be a microphone configured to transmit sound. The response of the membrane is different when no object is present in the acoustic path of the acoustic signal being produced by the membrane, as compared to the case when the object is present in the acoustic path such that at least a part of the acoustic signal is reflected back to the membrane. When the reflected signal reaches the membrane, at least some acoustic energy will be transferred to the membrane which will result in a change in the response of the membrane. The applicant had realized that this change in response can be measured by monitoring at least some of the loudspeaker parameters that are already being used for speaker protection. As compared to usual acoustic detection systems, it is not required to first transmit and then listen at the transducer. The detection can be performed while the loudspeaker safe limits are being verified. This when combined with the advantage that the SPM can do both functions simultaneously can be a significant advantage commercially and technically.

A further advantage can be that in cases the audio is being played by the electronic device, a separate cover detection system if present in the device may be disabled and the SPM be used for cover detection or short-range proximity detection. This can save power, and thus improve the available battery time.

According to an aspect, at least some of the one or more parameters are used to define a loudspeaker model. The loudspeaker model may be stored in a memory either in the SPM and/or in another accessible part of the electronic device. The loudspeaker model can be representative of a transfer-function of the loudspeaker. Accordingly, the electronic device can determine via the speaker protection module, or more specifically via the processing unit, an expected response of the loudspeaker with a given audio input signal value. The audio input signal value can be provided at an audio input of the speaker protection module. The loudspeaker model may be dynamically updated by the SPM either by calibration or in real-time. The SPM may use one or more calibration signals, such as pilot tones for calibrating the loudspeaker model.

According to another aspect, the electronic device is further configured to transmit ultrasonic signal either through the same loudspeaker or a different transducer. Those skilled in the art will understand that ultrasonic transducers are a type of acoustic transducers, that are based upon transmission and/or reception of acoustic signals in the ultrasonic range. Ultrasonic signals lie outside the typical human audible range, so they may be transmitted from the electronic device either alone or simultaneous to the audio signals, for example, music playback or speaker output during phone calls. Accordingly, the electronic device may use ultrasonic proximity detection simultaneous to or instead of an audible acoustic signal through the loudspeaker. The electronic device may even comprise one or more ultrasonic receivers for receiving ultrasonic signal or a reflection thereof.

According to an aspect, at least one of the one or more parameters relating to the loudspeaker is derived from the amplified audio signal. For example, the at least one parameter is an I/V signal derived from the amplified audio signal. Accordingly, at least one of the one or more parameters is an electrical signal related to the loudspeaker. At least one of those parameters may also be a reference value of the I/V signal. Some of those parameters may even be model parameters or threshold values against which the respective electrical signal related to the loudspeaker derived through the amplified audio signal is compared or even correlated.

According to an aspect, the second portion is at least partially a part of the processing unit. This can have further advantages in terms of costs, and even performance, by reutilizing at least partially the processing already being performed by the processing unit for generating the controlled audio signal. The second portion can thus be the same processor as the processing unit in terms of hardware.

Accordingly, there can also be provided a speaker protection module comprising:
 a controlled output configured to produce a controlled audio signal via a processing unit;
 an amplifier output configured to deliver an amplified audio signal to a loudspeaker;
 an amplifier configured to amplify at least said controlled audio signal to produce the amplified audio signal, wherein
  an amplitude of the controlled audio signal is such that the amplified audio signal is less than or equal to an amplitude determined to be safe for the loudspeaker in view of one or more parameters extracted from the amplified audio signal; and wherein
the processing unit is further configured to analyze at least one of one or more parameters extracted from the amplified audio signal to detect a change in response of the loudspeaker for determining the presence of an object in close proximity to the loudspeaker. The device may also include an audio input configured to receive an audio signal where the processing unit is configured receive said audio signal.

When viewed from yet another perspective, there can also be provided a method for detection of an object in proximity to an electronic device, which method comprises:

receiving an audio signal at an audio input;
processing the audio signal using a processing unit;
producing, via the processing unit using one or more parameters relating to a loudspeaker, a controlled audio signal;
amplifying using an amplifier at least said controlled audio signal, thereby producing an amplified audio signal at an amplifier output; wherein an amplitude of the controlled audio signal is such that the amplified audio signal is less than or equal to an amplitude determined to be safe for the loudspeaker in view of the one or more parameters,
delivering the amplified output signal to the loudspeaker operatively connected at the amplifier output;
determining using the amplified audio signal at least one of the parameters relating to the loudspeaker;
producing, via a movable membrane of the loudspeaker, an acoustic signal dependent upon the amplified output signal;
analyzing at least one of said one or more parameters relating to the loudspeaker to detect a change in response of the movable membrane; the change in response being caused by an object that is present in the acoustical path of the membrane,
determining, based upon the analysis whether the object is located in close proximity to the electronic device.

When viewed from yet another perspective, the present teachings can also provide a computer software product for implementing any of the method steps disclosed herein using a suitable processor. Accordingly, the present teachings also relate to a computer readable program code having specific capabilities for executing any method steps herein disclosed. In other words, the present teachings relate also to a non-transitory computer readable medium storing a program causing an electronic device to execute any method steps herein disclosed.

More specifically, there can also be provided a computer software product which, when executed by a processor of an electronic device, causes the electronic device to:

receive an audio signal at an audio input;
process the audio signal using the processor;
produce, via the processor using one or more parameters relating to a loudspeaker, a controlled audio signal;
amplify using an amplifier at least said controlled audio signal, thereby producing an amplified audio signal at an amplifier output; wherein an amplitude of the controlled audio signal is such that the amplified audio signal is less than or equal to an amplitude determined to be safe for the loudspeaker in view of the one or more parameters,
deliver the amplified output signal to the loudspeaker operatively connected at the amplifier output;
determine using the amplified audio signal at least one of the parameters relating to the loudspeaker;
produce, via a movable membrane of the loudspeaker, an acoustic signal dependent upon the amplified output signal;
analyze at least one of said one or more parameters relating to the loudspeaker to detect a change in response of the movable membrane; the change in response being caused by an object that is present in the acoustical path of the membrane,
determine, based upon the analysis whether the object is located in close proximity to the electronic device.

Those skilled in the art will appreciate that the teachings in this disclosure are not limited to loudspeakers comprising windings or coil. For the sake of simplicity, such loudspeakers are discussed in the examples herein. Accordingly, any kind of acoustic transducer that may require a protection from overdrive and thus uses an SPM can benefit from the present teachings for proximity detection as long as a change in response of the transducer can be detected due to an object being introduced in the acoustical path. For example, certain kinds of piezoelectric transducers may also be used for sound transmission. The present teachings may thus also be suitable for providing proximity detection capability while alleviating the similar overdrive issues in such piezoelectric transducers, or other kinds of acoustic transduces.

It will further be appreciated that the processing unit can be any type of computer or data processor such as a microprocessor or microcontroller. The processing unit or processor may be even be a DSP, an FPGA, or an ASIC. The processing unit may be a combination of different hardware components or modules. In some cases, the processing unit may essentially be a virtual machine running on a processor. In some cases, the processing unit may also include a machine learning module for improving the accuracy of measurements over use cases of the electronic device. The processing unit may further include a machine learning ("ML") module and/or an artificial intelligence ("AI") module.

The electronic device may be any device, mobile or stationary. Accordingly, devices such as mobile phones, tablets, voice assistants, smart speakers, notebook computers, desktop computers, and similar devices can fall within the ambit of the term electronic device. In addition, devices such as internet routers, vending machines, video games, automobiles, gates, doors, home appliances, and other kinds of electronic also fall within the ambit of the term.

The processing of the ultrasonic signals may be based on time of flight ("TOF") measurements between the transmitted ultrasonic signal and the corresponding reflected signal or echo received by the ultrasonic receiver. The receiver converts the echo to a measured signal. The processing of the echo signals may also be based on the amplitude of the measured signal, or phase difference between the transmitted signal and the measured signal, or the frequency difference between the transmitted signal and the measured signal, or a combination thereof. The transmitted ultrasound signal may comprise either a single frequency or a plurality of frequencies. In some cases, the transmitted ultrasound signal may comprise chirps.

Example embodiments are described hereinafter with reference to the accompanying drawings. Drawings may not necessarily be drawn to scale, without that affecting the scope of generality of the present teachings.

DETAILED DESCRIPTION

An electroacoustic transducer such as a loudspeaker, or speaker, is used to convert electrical energy to acoustical energy. When a typical speaker is driven, an electric current flows through the windings of the speaker and a magnetic field is thus created. The windings, or the voice coil, move in the magnetic field due to a magnetic force. A movable membrane, i.e., including all the moving parts of the speaker including diaphragm, frame, suspension, is attached to the windings; thus the membrane moves the same way as the windings thereby producing an acoustic signal in response to the electric current in the windings.

A speaker can be damaged by overdriving, i.e., by driving the with signals having too great an amplitude or power. The speaker may be damaged mainly by two ways, i.e., mechanically, e.g., due to an excessive excursion of the movable membrane, or thermally due to excess temperature, usually in the windings. As the speaker is driven, the electrical current in the windings also results in an $I^2R$ loss, which causes the windings to heat up. Due to excessive heat, the windings may get damaged, or even the epoxy around the windings may melt and seize further movement of the membrane. A damage may also result as a combination of the these. Accordingly, some electronic devices employ a "Speaker Protection Module" ("SPM") in order to protect the loudspeaker from being overdriven in order to avoid damage of the loudspeaker whilst maximizing the audio output from the loudspeaker.

Modern electronic devices such as mobile phones and tablets are also usually equipped with hardware to produce audible sounds, e.g. for playing multimedia content such as music, videos and for telecommunications such as phone calls. Generally, this hardware includes an amplifier—such as a power amplifier ("PA")—that is arranged to receive an input signal (e.g. from a microprocessor, memory, storage medium, etc.) and amplify it so as to render it suitable for driving a loudspeaker. It can be particularly important in mobile devices to maximize the audio performance as size and weight of the device are of critical importance.

SPMs usually include a power amplifier, and a speaker protection algorithm. The speaker protection algorithm protects the speaker from excursion and thermal damage. SPMs usually monitor the output of the loudspeaker (e.g. by monitoring a signal indicative of the driving electrical power fed to the loudspeaker) and other local environmental factors such as the temperature and feed these into the speaker protection algorithm that dynamically adjusts the electrical signal fed to the speaker with a view to optimizing the speaker protection such that the loudspeaker is not overdriven without subjecting the output to unnecessary limitations (e.g. limiting the amplitude of the audio output signal by more than is actually required), thus potentially allowing the loudspeaker to be driven as fully as conditions will allow at all times.

Typically, audio signal that is to be output by the electronic device via the loudspeaker passes from the source, which may be a microprocessor or a system-on-chip (SoC), through the SPM before being amplified by the amplifier. The SPM usually takes the input audio signal and produces a controlled audio signal that can be as high as the speaker can presently safely take after amplification. The amplified controlled audio signal is then typically used to directly drive the loudspeaker. Providing the speaker protection module is properly calibrated, the loudspeaker can thus be prevented from being overdriven. Thus, as also previously discussed, it will be understood that the movable membrane is used to generate an acoustic signal dependent upon the amplified audio signal.

The one or more parameters relating to the loudspeaker can be used to derive a loudspeaker temperature and/or a model of the loudspeaker. The loudspeaker model may be used, for example, to estimate the excursion of the membrane.

The signal indicative of the driving electrical power fed to the loudspeaker is usually an I/V signal, which can be generated by an I/V sense resistor or any other electrical component that can directly or indirectly provide the signal indicative of the driving electrical power. The electrical component may also be a plurality of components. The electrical component can be any suitable current sensing component. According to an aspect, the I/V sense signal may be a differential signal measured across the electrical component. For example, the differential signal may be a voltage drop across the electrical component, such as a resistor or a passive or active semiconductor component. The electrical component may even be a current-mirror. The I/V signal may even undergo signal processing such as any of the: amplification, filtering, and averaging. The signal processing may also involve an analog-to-digital conversion, for example, using an analog-to-digital converter ("ADC"). The I/V signal may thus be converted to a digital I/V signal, for example for further analysis using a digital processor such as a microprocessor, FPGA, or digital signal processor ("DSP"). Those skilled in the art of amplifiers will understand how I/V sensing and signal processing work, so further details regarding it are not required in this disclosure without affecting the scope or generality of the present teachings.

The speaker temperature and the speaker model is derived from I/V sense. This is used to adaptively modify the input signal in the Power/Excursion protection block so that the output provided to the speaker is within the excursion and thermal limit of the speaker.

Ultrasonic sensors are a type of acoustic sensors, that are based upon transmission and reception of acoustic signals in the ultrasonic range. Ultrasonic signals lie outside the typical human audible range, so they may be transmitted from the electronic device either alone or simultaneous to the audio signals, for example, music playback or speaker output during phone calls.

Figure 1:
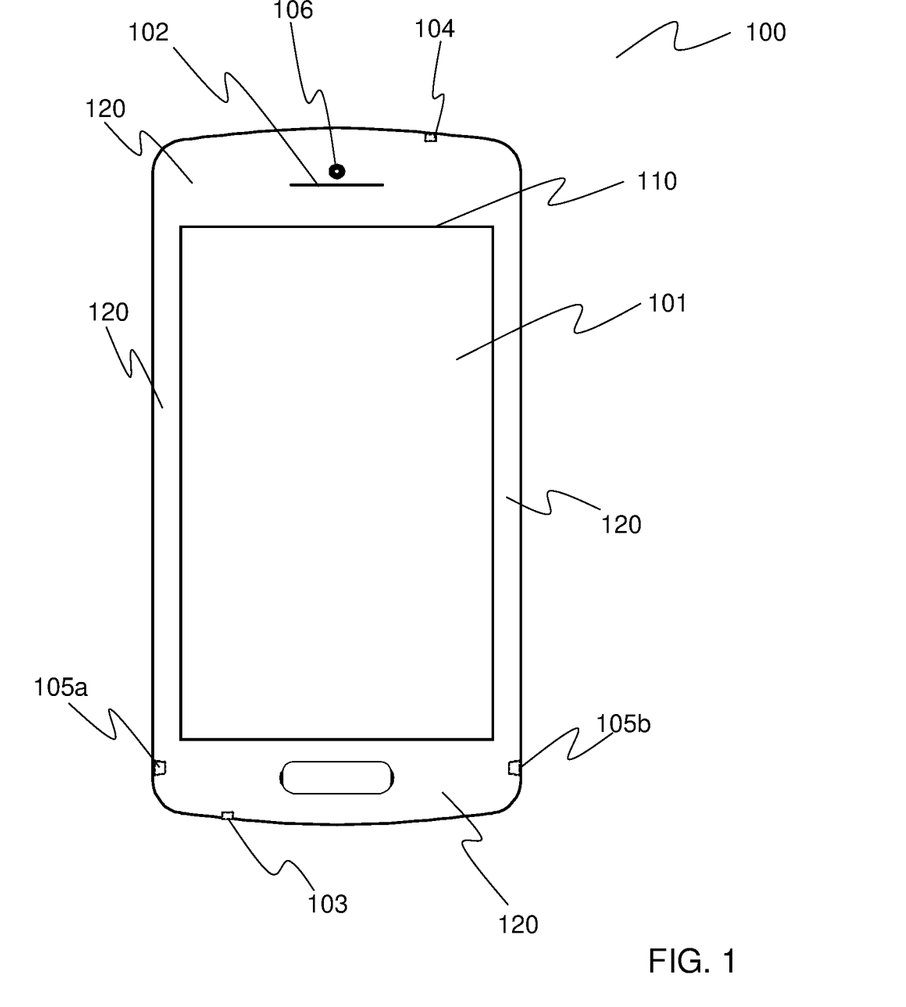
FIG. 1 shows a perspective front view of an electronic device with a proximity detection system

FIG. 1 shows an example perspective front view of an electronic device 100 which is shown here as a mobile phone or smartphone. The mobile phone 100 has a screen 101 for displaying content and for interacting with the device 100. Above the top-edge 110 of the screen 101, an earpiece 102 and a proximity sensor 106 are located. The terms top, bottom, left, right are used in the disclosure in a relative sense for the ease of understanding. Moreover, the location of the respective components such as the proximity sensor 106 is shown just as an example. Those skilled in the art will appreciate that such a sensor, or even the earpiece 102 can be located at a different position as compared to those in this example, without affecting the scope or generality of this disclosure.

As will be understood, the earpiece 102 comprises a speaker that is used for outputting acoustic signals such as audio of a call. In certain phones, the same speaker in the earpiece 102 may also be used for outputting ultrasonic signals, for example for ultrasound-based user interaction. The screen 101 can comprise not only a display for displaying content such as pictures and videos, but also a touch-screen sensor for touch-based user interaction. The proximity sensor 106 is in some cases infrared ("IR") detection based, but it can also be an acoustic-detection based sensor, or another type of sensor suitable for proximity detection. The proximity sensor 106 has field of view ("FoV"), which is a three-dimensional envelope or space around the sensor 106 within which the sensor 106 can reliably detect a proximity event, such as a near event. Detection of a near event is used, for example, to be able to switch off the touchscreen and display (or screen 101) of the device 100 such that undesired touchscreen operation may be prevented. Such an undesired touchscreen operation could otherwise occur when the user has placed the earpiece 120 in contact or close proximity to their ear and if the touchscreen were not disabled. Detection of a near event by using the proximity sensor 105 is used to disable the touchscreen such that undesired touchscreen operations can be prevented.

FIG. 1 also shows a pair of loudspeakers 105 and a microphone 103. Some phones may comprise one or more other speakers, such as 105, which are used for handsfree operation and/or for audio playback. Such other speakers 105 can be different from the earpiece 102, and such speakers 105 can be larger that the speaker in the earpiece. In the example shown, left speaker 105a and the right speaker 105b may be used for playing stereophonic audio. The microphone 103 on the bottom side of the phone 100 is commonly used for calls, especially when the user is holding the earpiece 102 close to their ear. The microphone 103 may also be used for handsfree operation or for other audio capture or recording.

Some phones may even comprise one or more additional microphones, for example a microphone 104 located on the top side of the phone. The additional microphone can for example be used for stereophonic audio capture, or for other purposes. There may even be multiple microphones on the top-side and/or on the bottom-side, or even on any of the sides of the device 100. In some devices, multiple microphones and/or multiple speakers may even be used for ultrasonic interaction with the device 100. In some cases, such ultrasonic sensing arrangement realized by speakers and microphones may remove the requirement of a dedicated proximity sensor 106. Accordingly in such cases, the device 100 may not have a separate proximity sensor 106.

It can be appreciated from FIG. 1 that the proximity sensor 106 requires precious space on the screen side of the device. Accordingly, in most cases a bezel 120 may be required to accommodate such components as the dedicated proximity sensor 160. In absence of such components, the screen 101 could be extended towards the edges of the device, thereby utilizing most, if not all, of the screen side of the device 100 as display area rather than wasting the space on dead area of the bezel 120.

One of the functions performed by the proximity sensor 106 is cover detection. Cover detection is a proximity detection for objects that are in close proximity to the device 100, or more accurately, from the proximity sensor 106. Accordingly, a presence of the following one or more objects within say 5 cm of the FoV of the proximity sensor 106 should trigger a cover detection: head of a user, palm of a user, side of a pocket or a bag, flip-cover when closed or nearly closed. Or more generally it can be said that bringing an object at least of a size of an adult finger within 5 cm in the FoV of the proximity sensor 106 should trigger a near state for the cover detection function. Similarly, when the object is removed from the FoV and/or beyond 5 cm of the sensor 106, a far state of the cover detection function should be triggered. It will be understood that the near state and the far state are mutually exclusive, i.e., a far state occurs when a near state is not detected.

For a smooth user experience and preventing false detection of near and/or far state, the cover detection function should be reliable and fact. This can also have an advantage of saving battery power.

Figure 2:
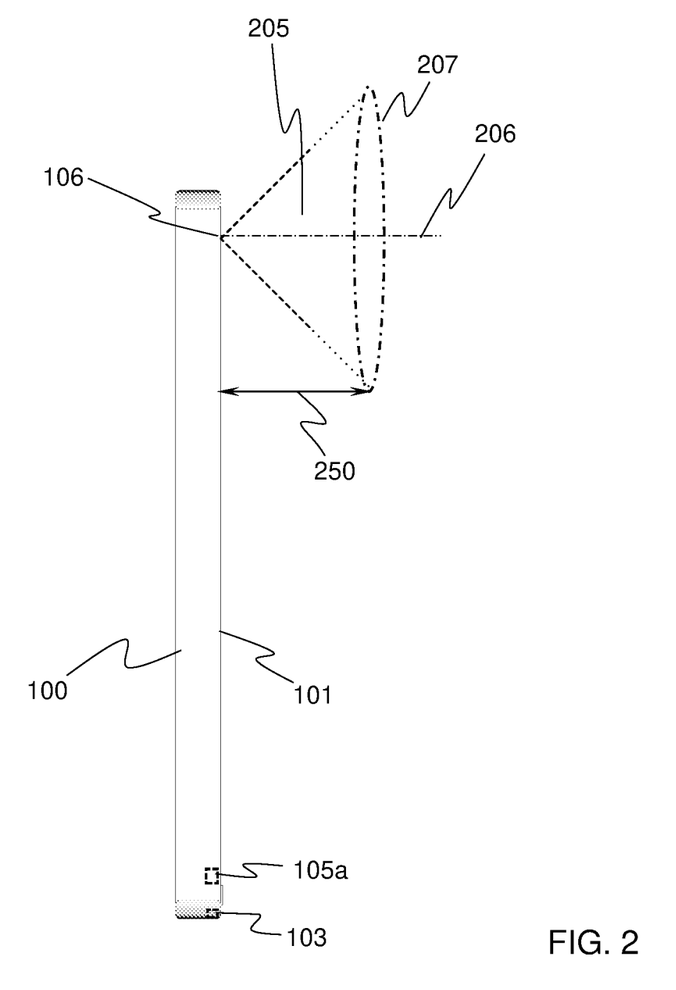
FIG. 2 shows a perspective side view of an electronic device with a proximity detection system

FIG. 2 shows a perspective side-view of the phone 100. The FoV 205 of the proximity sensing system is shown extending in a divergent manner from the proximity sensor 106 along an axis 206 such that the cross-sectional area of the FoV 205 in a plane normal to the axis 206 increases with distance from the proximity sensor 106 along the axis 206. Usually the FoV 205 will extend to a certain distance 250 from the sensor 106. Accordingly, FoV 205 is the region or 3D space within which the proximity sensing system can reliably detect the proximity of an object. In this example, the FoV 205 is shown here as a conical shape with its vertex at the location of the proximity sensor 106 and the base 207 of the cone representing the limit within which a reliable sensing is possible. Alternatively, the base 207 of the cone could represent the limit within which proximity sensing is desired. The conical shape of the FoV 205 is shown just as an example. In some cases, the FoV 205 may be asymmetrical in either or all directions and may have another shape depending upon the sensor used. For example, an ultrasound-based proximity sensor usually has a wider FoV 205 than an IR based proximity sensor 106. Moreover, the FoV 205 may even extend in a plane which is not normal, i.e., is at another angle, to the axis 206.

Those skilled in the art will recognize that a certain shape of the FoV 205 is not limiting to the scope or generality of the present teachings.

Figure 3:
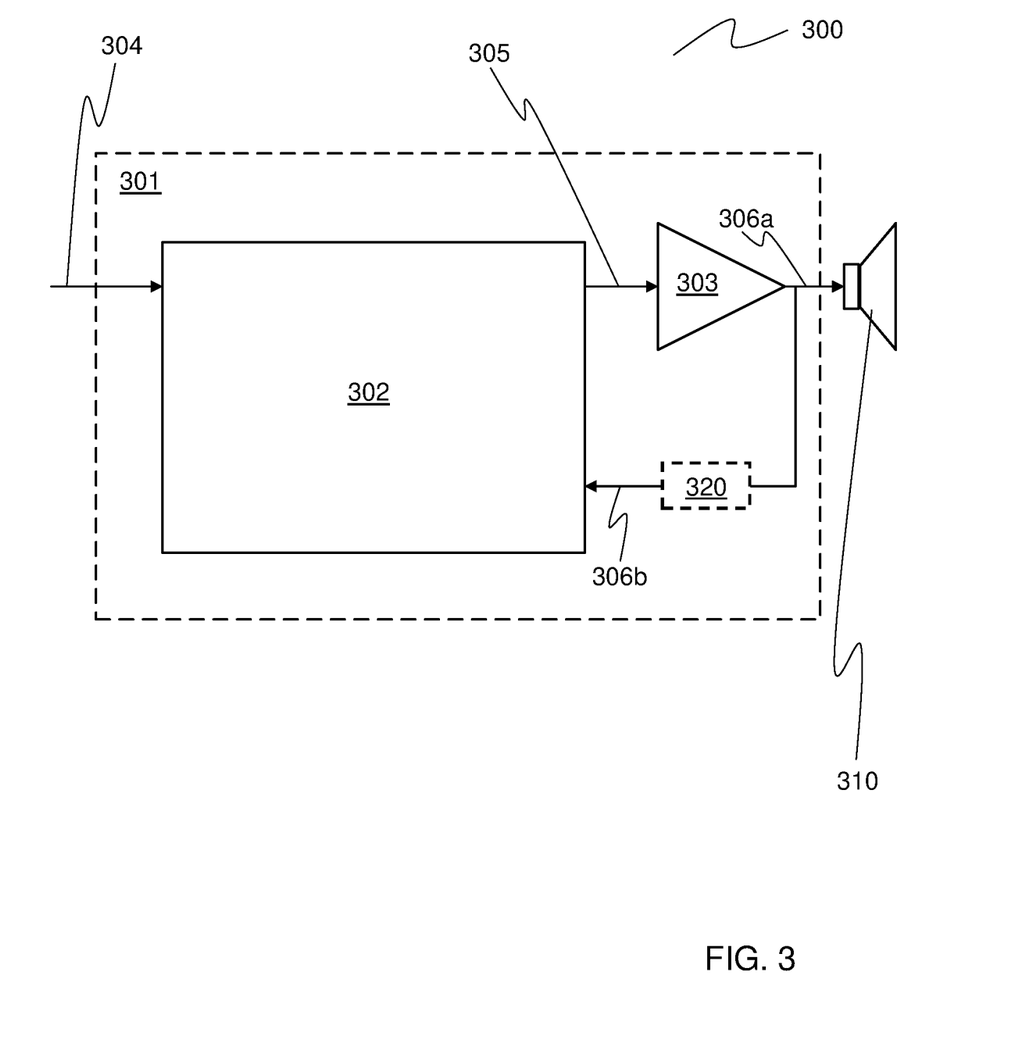
FIG. 3 shows a block diagram of an audio system comprising a Speaker Protection Module ("SPM")

Now referring to FIG. 3, which shows an audio system 300 comprising a Speaker Protection Module ("SPM") 301. The SPM 301 comprises at least one input and at least one output. The SPM 301 comprises at least an audio input 304. The SPM 301 also comprises an amplified audio output 306a which is operatively connected to a loudspeaker 310.

The audio input 304 is configured to receive an audio signal. The audio signal may be received at the audio input 304 through any suitable module or device, for example an audio DSP of the electronic device. The audio input 304 is operatively connected to a processing unit 302. Accordingly, the audio signal received at the audio input 304 is transmitted, either directly or via another module, to the processing unit 302. The processing unit 302 may comprise hardware signal processing modules, and/or the processing unit 302 is configured to execute a speaker protection algorithm for protecting the loudspeaker 310.

Accordingly, the processing unit 302 produces a controlled audio signal at a controlled output 305 which is operatively connected to an amplifier 303.

The amplifier 303 is configured to amplify the controlled audio signal, either directly or via another module, to produce an amplified audio signal at an amplifier output 306a.

The amplifier output 306a is configured to deliver the amplified audio signal to the loudspeaker 310, either directly or via any other suitable device such as a signal processing device, for example, a buffer, another amplifier, attenuator, filter, or any combination of such signal processing devices. Accordingly, the loudspeaker 310 is configured to produce an acoustic signal dependent upon the amplified output signal. As discussed previously, the acoustic signal is produced via a movable membrane of the loudspeaker 310.

For protecting the speaker 310, the processing unit 302 is configured to monitor the amplified output signal. Accordingly, the processing unit 302 uses one or more parameters relating to the loudspeaker 310 for protection from overdrive. At least one of the parameters are derived from the amplified output signal, or from sensing done at the amplifier output 306a. In some cases, some of the parameters may be the specifications and/or a mathematical model of the speaker 310. In some cases, the model of the speaker 310 is at least partially derived from the measurements performed at the amplifier output 306a.

The measurements or sensing at the amplifier output 306a can for example be performed by I/V sensing at the amplified audio output 306a. Accordingly, a current sensing component, such as a resistor may be placed in series, with one terminal of the current sensing component connected towards the amplifier 303 while another terminal of the current sensing component connected towards the speaker 310 such that the current being delivered to the speaker 310 is arranged to flow through the current sensing component. It will be understood by those skilled in the art that the current will result in a voltage drop across the component, which will be dependent upon the current or power being delivered to the speaker 310. Any suitable sensing component 320, connected either in series as outlined above, and/or in a different arrangement with respect to the amplifier output 306a can be used as long as the component 320 or arrangement can provide a signal indicative of at least one parameter relating to a speaker 310, which signal can be used for protecting the speaker 310 from overdrive, mechanical and/or thermal. Other examples of such components are: current mirror, shunt resistor, voltage divider, current sensing amplifier, differential amplifier, and transformer. A specific kind of sensing is not limiting to the scope or generality of the present teachings.

An amplitude of the controlled audio signal is such that the amplified audio signal is less than or equal to an amplitude determined to be safe for the loudspeaker. Accordingly, the processing unit 302 is configured to generate the controlled audio signal, at the controlled output 305, with such an amplitude such that the amplified audio signal is less than or equal to an amplitude determined to be safe for the loudspeaker in view of the one or more parameters. In other words, the processing unit 302, via a hardware module and/or the speaker protection algorithm, adapts the controlled audio signal such that the amplified audio signal is less than or equal to an amplitude determined to be safe for the loudspeaker.

In FIG. 3 the sensing component 320 is shown as being in series between the amplifier output 306a and a measured amplifier output 306b, but it can be any type of the components as mentioned previously. In some cases, the sensing component 320 may be at least partially comprised in or internal to the processing unit 302. It will be understood that in cases where the sensing component 320 is internal to the processing unit 302, the measured amplified output 306b would also be internal to the processing unit 302. In such cases, the amplifier output 306a may be directly connected also to the processing unit 302.

The amplifier 303 is shown as a part of the SPM 301, but it can also be at least partially external to the SPM 301. In some cases, the amplifier 303 may at least partially be a part of the processing unit.

Figure 4:
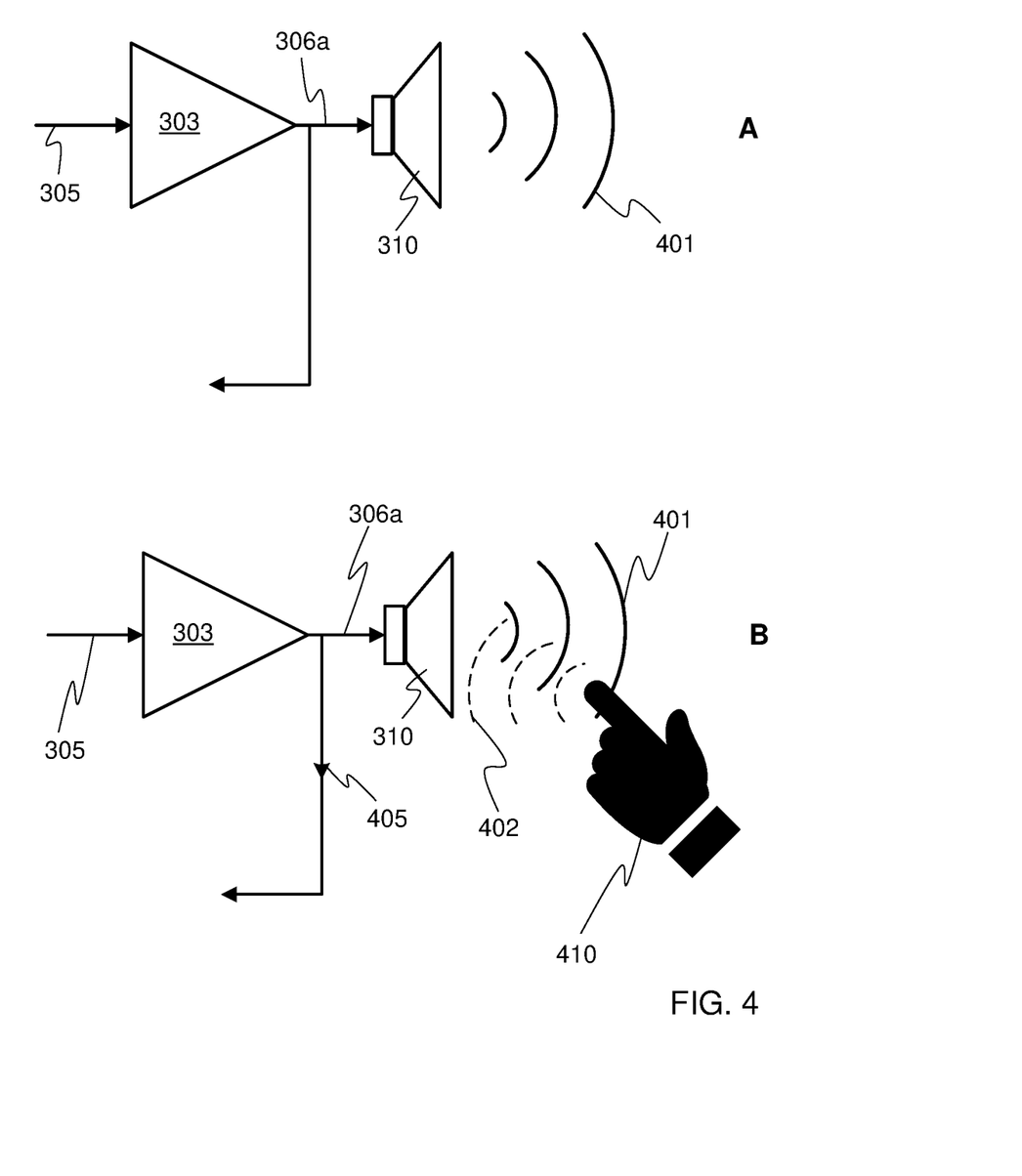
FIG. 4 shows a close-range proximity measurement using the SPM

Now referring to FIG. 4, which shows a close-range proximity measurement using the SPM 301. Not all portions of the SPM 301 are explicitly shown in FIG. 4 for simplicity. Moreover, the sensing component 320 is not shown either. As described above, the component 320 may be deemed present in FIG. 4, or the component 320 may be assumed a part of the processing unit 302 as explained previously. In FIG. 4, the controlled output 305 is providing a controlled audio signal to the amplifier 303. The amplifier 303 is generating an amplified audio signal, dependent upon the controlled audio signal, at the amplifier output 306a.

The amplified audio signal is being fed to the loudspeaker 310 that is generating an acoustic signal 401 dependent upon the amplified audio signal.

More specifically referring now to FIG. 4A, which shows a case when no object is present in close proximity to the speaker 310. In this case A, the signal at the amplifier output 306a, or a measured copy of the signal is fed to the processing unit 302. The processing unit 302 thus adapts the controlled audio signal such that the amplified audio signal is less than or equal to an amplitude determined to be safe for the loudspeaker 310.

In FIG. 4B, a hand 410 of a user is shown in close proximity to the speaker 310. More specifically, the hand 410 is in the acoustic path of the speaker 310. The acoustic path can be viewed as a Field of View ("FoV") of the speaker 310 such that a reflection 402 of the acoustic signal 401 can reach the speaker 310 and can produce a measurable signal change 405 at the amplifier output 306a, or at the input of the speaker.

The signal change 405 in the amplified audio signal, or more specifically in the signal fed to the speaker 310 can be measured via the sensing component 320 and thus used by the processing unit 302 to determine that an object (here, the hand 410) is in close proximity to the speaker 310, or the electronic device of which the speaker 310 is a part of.

The signal change 405 results in a change in response or dynamics of the speaker 310 which can be measured via the sensing component 320. It will be appreciated that to cause a measurable change 405, both the distance of the object from the speaker as well as the size of the object are important. More specifically, the object should be larger than a certain size and the distance of the object from the speaker 310 should be smaller than a certain value to be reliably detected. Moreover, each specific object can have a certain maximum distance at which it can be detected. Since, the scope of the present teachings is cover detection, i.e., detection of a condition when the electronic device is "covered", it will be implicitly known to those skilled in the art what kind of objects can and should be detected by using the present teachings. It is not required to describe what and how large the objects should be. As non-limiting examples, the object can be one or more, or even a combination of: a finger of a user, a hand, a cover, a sheet of paper or a surface of a book, a surface of a pocket or a bag.

The signal change 405 can for example be caused by standing waves caused by the acoustic signal 401 interacting with its reflection 402. Moreover, other phenomenon such as resonance may also contribute to the signal change 405.

In some cases, the input of the speaker 310 is the same input that is connected to the amplifier output 306a. Alternatively or in addition, the input can be a different interface of the speaker dedicated for measuring at least some of the parameters of the speaker 310. As it will be appreciated, the different interface can be one or more terminals coupled to the membrane of the speaker 310 for measuring at least some of the speaker parameters.

Figure 5:
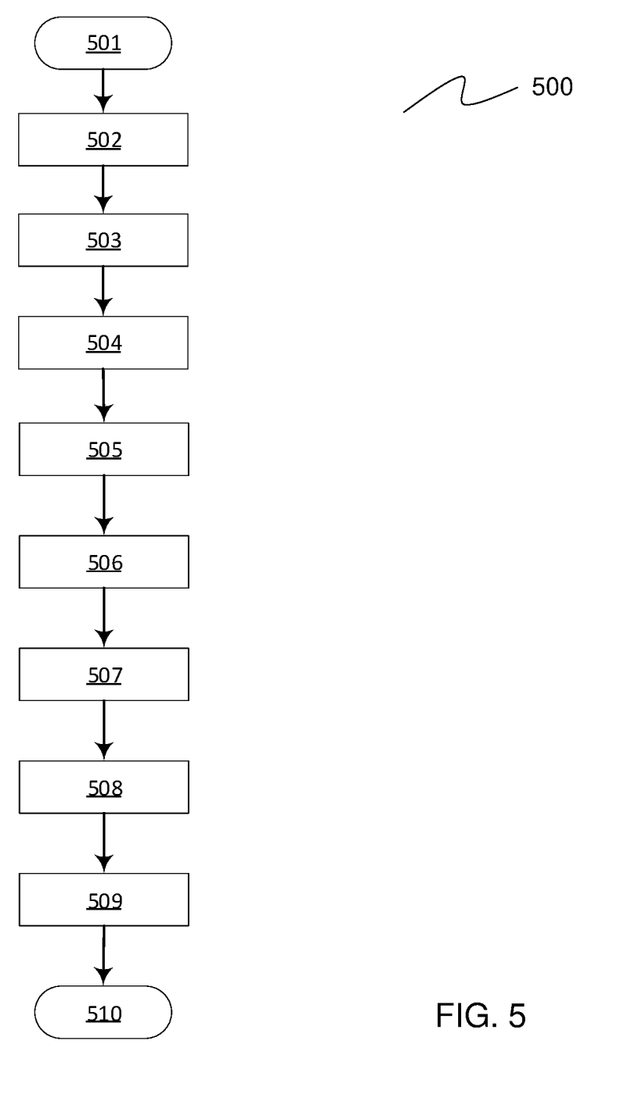
FIG. 5 shows a flow-chart of a method for close range proximity measurement using the SPM

FIG. 5 shows a flowchart 500 of a method for close range proximity detection using the SPM. At start 501, an audio signal is received. The audio signal can be received at the audio input 304. Then, in another step 502, the audio signal or a copy thereof is processed. The audio signal can be processed using the processing unit 302. In yet another step 503, a controlled audio signal is produced. The controlled audio signal can be produced by the processing unit 302, for example, at the controlled output 305. The controlled audio signal is further produced using one or more parameters related to the loudspeaker 310. In another step 504, an amplified audio signal is produced. The amplified audio signal can be produced by amplifying the controlled audio signal using the amplifier 303. Preferably, an amplitude of the controlled audio signal is such that the amplified audio signal is less than or equal to an amplitude determined to be safe for the loudspeaker 310 in view of the one or more parameters. In another step 505, the amplified audio signal is delivered to the loudspeaker 310. The loudspeaker 310 is operatively connected to the amplifier output 306a. In another step 506, a signal at the amplifier output 306a, or the amplified audio signal is used to determine at least one of the parameters relating to the loudspeaker 310. The sensing component 320 may be used to provide a measurement of the amplified audio signal to the processing unit 302 such that the processing unit 302, e.g., in step 503, can adapt the amplitude of the controlled audio signal such that the amplified audio signal is less than or equal to the amplitude determined to be safe for the loudspeaker 310. In yet another step 507, an acoustic signal is produced. The acoustic signal is produced by the loudspeaker 310 is dependent upon the amplified audio signal. It will be appreciated that the acoustic signal is produced vis the movable membrane of the loudspeaker 310. In another step 508, a change in response of the movable membrane caused by an object is detected. The change in response of the membrane can be detected by analyzing at least one of said one or more parameters relating to the loudspeaker 310. More specifically, the change in response can be detected by analyzing the amplified audio signal or a derived signal thereof, as outlined in step 506. Accordingly, the signal change 405 can be measured by the processing unit. In a following step 509, based upon the analysis it is determined whether the object is in close proximity to the loudspeaker 310. The determination can be made by the processing unit 302.

In the last step 510, the method may either end or the method may be repeated from the first step or from any of the intermediate steps.

Various embodiments have been described above for an electronic device comprising an SPM for proximity detection, an SPM capable of proximity detection, a method for proximity detection using an SPM and a computer software product for at least partially implementing the method. Those skilled in the art will understand, however that changes and modifications may be made to those examples without departing from the spirit and scope of the following claims and their equivalents. It will further be appreciated that aspects and/or features from the method and product embodiments discussed herein may be freely combined.

The invention claimed is:

1. A method for detection of an object in proximity to an electronic device, the method comprising:
producing, via a processing unit using one or more parameters relating to a loudspeaker, a controlled audio signal;
amplifying using an amplifier at least the controlled audio signal, thereby producing an amplified audio signal at an amplifier output; wherein an amplitude of the controlled audio signal is such that the amplified audio signal is less than or equal to an amplitude determined to be safe for the loudspeaker in view of the one or more parameters;
delivering the amplified output signal to the loudspeaker operatively connected at the amplifier output;
determining using the amplified audio signal at least one of the parameters relating to the loudspeaker;
producing, via the loudspeaker, an acoustic signal dependent upon the amplified output signal;
analyzing at least one of the one or more parameters relating to the loudspeaker to detect a change in response of the loudspeaker; the change in response being caused by an object that is present in the acoustical path of the loudspeaker;
determining, based upon the analysis whether the object is located in close proximity to the electronic device; and
an initial step of transmitting a chosen acoustic signal, the return of which constitutes the audio signal at the audio input.

2. The method according to claim 1, wherein the controlled audio signal is outside the audible range.

3. A method for detection of an object in proximity to an electronic device, the method comprising:
producing, via a processing unit using one or more parameters relating to a loudspeaker, a controlled audio signal;
amplifying using an amplifier at least the controlled audio signal, thereby producing an amplified audio signal at an amplifier output; wherein an amplitude of the controlled audio signal is such that the amplified audio signal is less than or equal to an amplitude determined to be safe for the loudspeaker in view of the one or more parameters;
delivering the amplified output signal to the loudspeaker operatively connected at the amplifier output;
determining using the amplified audio signal at least one of the parameters relating to the loudspeaker;
producing, via the loudspeaker, an acoustic signal dependent upon the amplified output signal;
analyzing at least one of the one or more parameters relating to the loudspeaker to detect a change in response of the loudspeaker; the change in response being caused by an object that is present in the acoustical path of the loudspeaker;
determining, based upon the analysis whether the object is located in close proximity to the electronic device; and
wherein the produced acoustic signal is produced with a movable membrane of the loudspeaker, the acoustic signal dependent upon the amplified output signal; and the change in response of the loudspeaker is a change in the response of the movable membrane.

4. The method according to claim 1, wherein the at least one parameter is defined by a predetermined loudspeaker model being stored in a memory in the electronic device.

5. A method for detection of an object in proximity to an electronic device, the method comprising:
producing, via a processing unit using one or more parameters relating to a loudspeaker, a controlled audio signal;
amplifying using an amplifier at least the controlled audio signal, thereby producing an amplified audio signal at an amplifier output; wherein an amplitude of the controlled audio signal is such that the amplified audio signal is less than or equal to an amplitude determined to be safe for the loudspeaker in view of the one or more parameters;
delivering the amplified output signal to the loudspeaker operatively connected at the amplifier output;
determining using the amplified audio signal at least one of the parameters relating to the loudspeaker;
producing, via the loudspeaker, an acoustic signal dependent upon the amplified output signal;
analyzing at least one of the one or more parameters relating to the loudspeaker to detect a change in response of the loudspeaker; the change in response being caused by an object that is present in the acoustical path of the loudspeaker;

determining, based upon the analysis whether the object is located in close proximity to the electronic device; and wherein the at least one parameter is predetermined from measured performance without an object in the acoustic path.

6. The method according to claim 1, wherein one of the at least one parameter is an UV signal derived from the amplified audio signal.

7. The method according to claim 6, wherein one of those parameters is the reference value of the UV signal.

8. The method according to claim 1, including the initial steps of receiving an acoustic signal at an audio input generating an audio signal and processing the audio signal using a processing unit.

9. An electronic device comprising:
a first portion configured to generate an acoustic signal;
a loudspeaker for generating the acoustic signal, the loudspeaker comprising a moveable membrane;
a speaker protection module comprising a processing unit, the speaker protection module being configured to produce, via the processing unit using one or more parameters relating to the loudspeaker, a controlled audio signal;
an amplifier configured to amplify at least the controlled audio signal to produce the amplified audio signal which is passed to the loudspeaker for generating the acoustic signal;
wherein an amplitude of the controlled audio signal is such that the amplified audio signal is less than or equal to an amplitude determined to be safe for the loudspeaker in view of the one or more parameters;
a second portion configured to analyze at least one of the one or more parameters relating to the loudspeaker to detect a change in response of the loudspeaker, the change in response being caused by an object that is present in the acoustical path, and the second portion is configured to determine, based upon the analysis of the at least one parameter whether the object is located in close proximity to the electronic device;
wherein the movable membrane, the change in response being caused by an object that is present in the acoustical path of the membrane, and the second portion is configured to determine, based upon the analysis of the at least one parameter whether the object is located in close proximity to the electronic device; and
wherein the controlled audio signal is outside the audible frequency range.

10. The device according to claim 9, wherein the change in response is caused by an object that is present in the acoustical path of the membrane.

11. An electronic device comprising:
a first portion configured to generate an acoustic signal;
a loudspeaker for generating the acoustic signal, the loudspeaker comprising a moveable membrane;
a speaker protection module comprising a processing unit, the speaker protection module being configured to produce, via the processing unit using one or more parameters relating to the loudspeaker, a controlled audio signal;
an amplifier configured to amplify at least the controlled audio signal to produce the amplified audio signal which is passed to the loudspeaker for generating the acoustic signal;
wherein an amplitude of the controlled audio signal is such that the amplified audio signal is less than or equal to an amplitude determined to be safe for the loudspeaker in view of the one or more parameters;
a second portion configured to analyze at least one of the one or more parameters relating to the loudspeaker to detect a change in response of the loudspeaker, the change in response being caused by an object that is present in the acoustical path, and the second portion is configured to determine, based upon the analysis of the at least one parameter whether the object is located in close proximity to the electronic device;
wherein the movable membrane, the change in response being caused by an object that is present in the acoustical path of the membrane, and the second portion is configured to determine, based upon the analysis of the at least one parameter whether the object is located in close proximity to the electronic device; and
a memory storing a at least one of the parameters are defined by a predetermined loudspeaker model representing the loudspeaker.

12. The device according to claim 11, wherein the stored parameter is calculated from measured performance without an object in the acoustic path.

13. The device according to claim 9, wherein one of the at least one parameters is an UV signal measured from the amplified audio signal.

14. The device according to claim 13, wherein one of those parameters is the reference value of the UV signal.

15. The device according to claim 9, the processing unit being configured for receiving an acoustic signal at an audio input.

* * * * *